Apr. 3, 1923.
J. H. SHARP
1,450,335
TRAVEL AND SALES GUIDE
Filed June 27, 1918
2 sheets-sheet 2
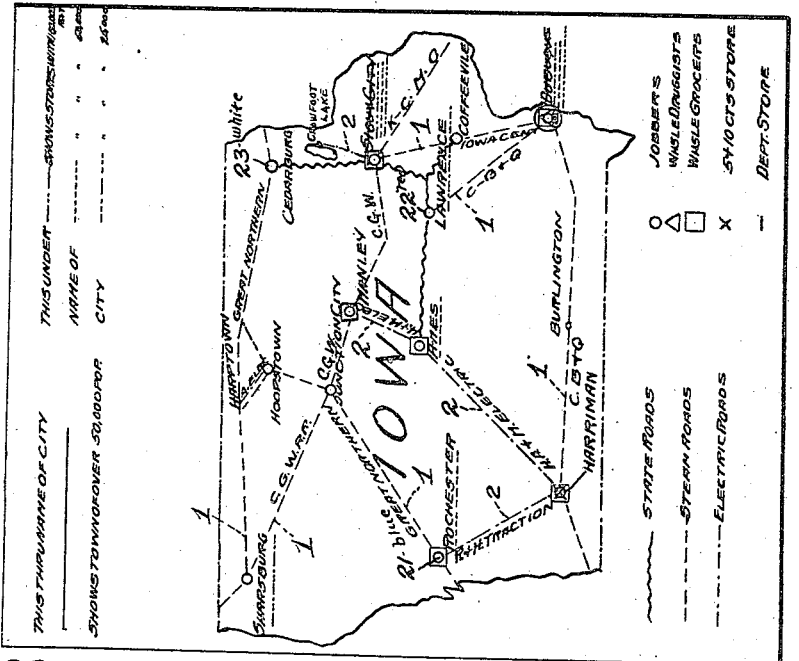

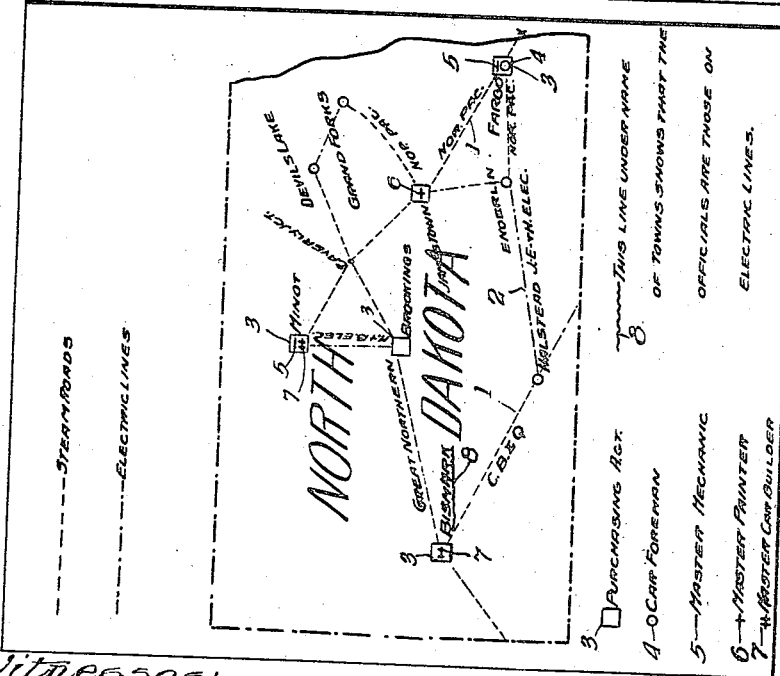

Patented Apr. 3, 1923.

1,450,335

UNITED STATES PATENT OFFICE.

JOHN H. SHARP, OF CHICAGO, ILLINOIS.

TRAVEL AND SALES GUIDE.

Application filed June 27, 1918. Serial No. 242,230.

*To all whom it may concern:*

Be it known that I, JOHN H. SHARP, a citizen of the United States, residing at Chicago, in the county of Cook and State of Illinois, have invented a certain new and useful Improvement in a Travel and Sales Guide, of which the following is a description.

My invention belongs to that general class of devices known as travel and sales guides for providing detailed information in such manner that the user is enabled to visualize certain territory or territories in connection with his work, all but the essential data applying to his particular task or line being eliminated. The invention has among its objects the production of a device of the kind described that is simple, convenient, compact, efficient and satisfactory for use wherever found applicable. It has particularly as an object the production of a device which will tend to reduce selling and advertising costs, and prevent unnecessary wastes. The same can also be used as an advertising means for hotels, transportation companies, health and pleasure resorts, etc., and when so used will materially reduce the cost of advertising, in that advertising accomplished through the device will reach only possible, or rather probable customers. In this way, advertising which would otherwise bear the expense of a wide distribution which reached a great many people and which cost a certain percentage for each person reached, and yet only a very small portion of them probable customers, would be avoided.

The invention can be utilized in many ways, but the preferred form is that of a map or chart showing certain territories described and carrying information either on the chart or map, or along the margin thereof, or in the form of sheets or books used in connection therewith. In practical use the device eliminates the possibility of salesmen or others calling on customers or prospects who would not be interested in the proposition under discussion, or whose business would be insufficient to warrant the time and money spent in soliciting, or whose credit rating and financial condition could not warrant the shipping of material in sufficient quantities to make a personal visit profitable. It will further enable traveling representatives to utilize every possible minute of the working day, it will eliminate the common occurrence of a man traveling from one point to another and passing several good prospects between the two points, because of lack of knowledge of location of the fact that they are on or only a short way from the direct line of travel. It will eliminate the possibility of a man traveling any but the shortest route and it will eliminate the necessity of his going in a round about way to reach certain points on account of lack of information.

There is nothing of this kind now on the market in so far as I am able to ascertain, and as a result hundreds of thousands of dollars are wasted annually in time and money because such information is not in a form to be easily or readily utilized. This invention will further enable the users to quickly and accurately figure route sheets and to ascertain very accurately the expense involved in any business trip. It will further enable companies with large numbers of traveling representatives to accurately check expense accounts.

Many other objects and advantages of the invention herein shown and described will be obvious to those skilled in the art from the disclosures herein given.

To this end my invention consists in the novel construction, arrangement and combination of parts herein shown and described and more particularly pointed out in the claims.

In the drawings, wherein like reference characters indicate like or corresponding parts, Fig. 1 is an illustrative map or chart embodying a portion of the information;

Fig. 2 is a cooperative chart formed therewith or separate, arranged to be used in connection therewith;

Fig. 3 is another form of chart;

Fig. 4 is a cooperating chart arranged to be used in connection therewith; and

Fig. 5 is a scale intended to be used in connection with either of the charts described or the like.

Referring to Fig. 1, in which a map or chart supposedly illustrating the State of North Dakota is shown, it may be mentioned that the same is not intended to be accurate, or the towns or the information shown necessarily more than illustrative so as to make the understanding of the invention clear, certain points are illustrated connected by railway lines, steam roads 1, electric lines 2, or the like, certain characters being provided to indicate certain desired information, as for example, purchasing agent 3 or car foreman 4, master mechanic 5, master painter 6, master car builder 7, etc., this particular chart illustrating one suitable for a company or salesman handling specialties or equipment for railroads and the like. The various symbols or characters, etc., may be of different colors, or different forms than those shown. In connection with this there is also provided a chart, sheet, book or the like 9, for example, similar to that shown in Fig. 2, it being understood that this is merely illustrative of one particular line of business, for example, this chart showing a particular territory 10, the cities 11, officials 12, road names 13, equipment 14, hotels 15, hotel rates 16, etc., symbols being used if desired. There will also preferably be provided in connection with the foregoing a gage similar to that shown in Fig. 5, in which 17 represents a body or the like of suitable material, for example celluloid, glass, or like material, having a central line 18 which may be divided into spaces representing miles. I also provide parallel lines 19 and 20 desired distances from the center line 18, these representing points at scale distances from the center line extending between the two points.

Assuming that a salesman is at point "X" on the North Dakota State line, the product he handles is a car specialty which can be used advantageously either by steam or electric railroads, and it is necessary for the salesman to call at the indicated points, for example, Minot and Bismarck, in answer to inquiries received by his company.

Without this map or information the traveler would go from the point "X" to Minot direct, spending a part of a night and all day on the train and arriving at Minot at an hour so late in the evening that it would be impossible for him to do any work that day and would necessitate his staying all night and paying hotel and other expenses. With this map and the information sheets, or the information on the edge of the map, he would see from the indicating marks at Fargo that there was a purchasing agent 3, a master mechanic 5 and car foreman 4 located at Fargo, and by referring to the sheets or to the information on the border of the map he would find that the road at Fargo was an electric line, The Fargo & Moorehead St. Ry., with 520 cars and could use several thousand dollars worth of material. He would find from the time tables of the railroad (with which every traveler is supplied or can easily obtain) that he could go from "X" to Fargo and spending the day in Fargo could work to advantage on this electric line, the officials who are located there being executive officials who have the authority to purchase his material. He would find further that the Northern Pacific Railroad had a car foreman at Fargo, and while this official was not an executive who could buy his material, he could recommend it to his superiors. If then the traveler had time before his train left to call on the car foreman, he would do so, if he did not have time, this official's inability to definitely place orders would not warrant his staying over, he could then take a train from Fargo which would land him in Minot the next morning and he would therefore save his hotel bill and the portion of the day that he would have spent on the train and would have thus greatly reduced his traveling expense and the time he had spent, and at the same time he would have called on an additional prospect. Without information in some such form he would be in the dark as to ways and means of getting from Minot to Bismarck and would probably go from Minot over the Northern Pacific to Caverly Junction and wait there for a Great Northern train to take him to Bismarck. But with this information he would find that he could go over the electric line to Brookings and over the Great Northern from Brookings to Bismarck and could so arrange his schedule as to call on the purchasing agent of the electric line at Brookings. While the sheets (see last line of Fig. 2) or marginal information would show this was a small road and the official could not place a very large order, at the same time he would probably land an order of sufficient size to pay his traveling expenses from Minot to Bismarck, having saved considerable time and having called on an additional prospect. While these cases are hypothetical, every travelling man will readily understand from actual experience that these savings can be effected and that they are being overlooked every day bcause of lack of information, and this information is the outcome of several years of study and compilation of information and maps covering the applicant's particular line of business, and the savings which have been effected have been large.

You will note that the information shown enables the traveler to ascertain definitely the names of the hotels, whether they are American or European plan and the rates, and by the use of light or heavy type or other suitable designation, is shown whether the hotel is strictly modern or first class or whether they are small commercial houses whose appointments are not all that could be desired, and a man is thus able to arrange his route so as to spend his nights in traveling in comfortable Pullmans or to arrange to stop over in towns where the information shows that the hotels are first class and good places to stay. This also enables the auditor to check the expense accounts of the travelers, since the rates and plans are shown.

Referring to Figs. 3 and 4, Fig. 3 shows a map or chart, which for illustration may be termed Iowa, the salesman being at Dubuque and desires to touch each of the points shown in handling a line of confectionery which could be sold to grocers, druggists and confectioners, both wholesale and retail, as well as to jobbers, department stores and five and ten cent stores. The salesman has only a high priced product unused by certain classes of people.

He finds from the indication on the map the classes of stores in each town and by the symbols, colors or other means used he finds the people in each district are engaged in certain lines of work which gives him an indication of whether or not they would be purchasers of his product. If these indications show that they would not be to any great extent, then he can afford to call only at one store in the town, that catering to the more exclusive trade. If, however, the indications on the map show that the people are engaged in work, which calls for a class of workmen who would probably all use his product, then he could call at each of the stores listed to his advantage and on the jobbers. The type used in printing the name of the town or some other indication will show whether or not there are more than one of each of the various classes of stores in the town and the marginal information sheets will show him the population of the town, the names of the stores, the line of business followed and the credit rating and whether the prospect is quick or slow paying. It will show him the names of the hotels and rates and the type or other means will indicate whether this is a good hotel, strictly fireproof, or whether he can more comfortably and to better advantage work in a town during the day and travel all night, or arrange to reach another town with a good hotel to stay over night.

Without the information in the form shown, the traveling man would undoubtedly travel over his territory overlooking a good many short cuts and probable customers several times before he worked out the best route and he might never find the best route. But with this information, together with the time tables of the roads, he could arrange advantageously to call upon the best prospects or the desirable customers in the shortest space of time and pass up the undesirable accounts in order to make the best connections on trains or electric lines. He would go from Dubuque to Harriman by the C. B. & Q., stopping off for a few hours in Burlington to call on a small dealer if the train schedules were so arranged as to allow him to do this and make good time. As for instance, say he was leaving Dubuque in the morning and the train did not arrive in Harriman until evening so that he could not work there that day, if there was another train following an hour or two later, he could make a call in Burlington and perhaps get an order which would pay his traveling expense from Dubuque to Harriman. From Harriman he would go to Rochester by the electric line, from Rochester to Junction City where there was no prospect, from Junction City to Sharpsburg where there was a customer, from Sharpsburg to Harptown where there was no prospect but where he could make connections for Hoopstown where there was a customer. From Hoopstown he would go by steam road to the connection of the Great Northern where there was no town but where the train stopped on signal. He would there catch the Great Northern train to Cedarburg, call on a customer there, go from Cedarburg by auto over the State road to Sioux City, and after working Sioux City take the C. G. W. Railroad to Manley, which, as shown in Fig. 3, is on the line connecting Sioux City and Sharpsburg, from Manley he would go by electric line to Ames. From Ames he would go by auto over the State road to Lawrence. After finishing there, he could go direct back to Dubuque over the C. B. & Q., if he found it necessary, or he could go by automobile to Coffeyville and after working in Coffeyville, take the Iowa Central to Dubuque. If any where along his route he received a letter or an inquiry or orders from the house which necessitated his going to some other town not on his direct line of travel, the information in the form covered by this invention would enable him to get there in the most direct route and in the shortest period of time, and it would also enable him to make business calls along the way if the time and connections warranted it.

With the gage shown in Fig. 5, made the same scale as the chart or map and covering a certain number of miles, and which may be remounted on the chart in any suitable manner, the salesman or traveler would place this on the chart with the center line on the town of starting, and a town farther on his route. He could then readily see or visualize all the points which could be touched to advantage between the two points, as well as the easiest and quickest way to get there. From the foregoing it will be obvious how this data can be utilized in the routing of salesmen and the figuring out of routes and the checking of expenses, the charts being drawn to scale and the rates of fare being governed by rules which standardize the amounts to be paid in car fare, this taken in connection with the amount of time allotted in each town and the hotel rates as shown, will enable the person laying out the route to accurately figure the approximate expenses, as well as to check the expense accounts of the salesmen, it having been found through practice that a traveling representative can save time and money by visiting every prospect within a strip of territory, say fifty or one hundred miles wide, lying each side of the direct line of travel between two limit points of the trip, a wide expanse of territory can be covered and laid out so as to save both time and expense.

Mounted, this map can be further used with colored pins or markers whereby these markers are used to indicate certain facts. For instance, a blue flag or a blue headed pin 21 would indicate that the prospects in a certain town were to be called upon by a salesman then on the road. A red flag or a pin 22 would indicate that orders had been received from the customer in that town during the current month. A white pin 23 would indicate that the salesman had just recently called and you will readily see that with sufficient numbers of indicators or markers in whatever form they happen to take, practically every form of desired information could be shown so that the executives could visualize conditions in each territory at a glance without reference to files or other data and say, for instance, that when an inquiry was received from a certain prospect in a certain town, a glance at the map when taken in consideration with the salesman's route sheet would show that the salesman would be there in time to handle the matter to an advantage or that he would not be there in time, and they would wire him to disregard his route sheet and go directly to the customer making the inquiry.

From the foregoing description anyone skilled in the art or those experienced in handling salesmen or traveling representatives or traveling men in any line of business, can readily understand the advantages and the principles involved, and the ways and means of utilizing this plan are extremely numerous.

Using the mounted map or this system in any form with suitable markers or designators will eliminate unnecessary calls, as for instance, a salesman is routed so as to call on 20 towns where customers are located but who had not placed orders for a certain period of time during which time the company figured they should have exhausted their stock and be ready to order again. The indicators show that a certain salesman is to call at a certain point and his route shows that he had not yet reached that town but an order is received at the factory. This order eliminates the necessity of the call but without the information in this form, chances are the route would not be changed. With this system, when the order came in it would be suitably shown on the map and when the marker showing the call to be made was changed for the marker showing that an order had been received, the office would wire or write the man to cut this town off his list. This would save considerable money in traveling expenses and salesmen's salaries.

This same system can be used to advantage in advertising places of amusement and summer resorts, it being an acknowledged fact that if a man is continually at his work with no relaxation or recreation, he cannot work to the best of his advantage, therefore showing the locations of amusement places would enable him to spend his leisure time such as Sundays at a place where he could relax and recuperate.

For instance, on the map of Iowa, if a man was in Sioux City on Saturday during the hot summer months and felt fatigued and indisposed on account of the extreme heat and yet was a stranger in the town and did not know where to go to rest and relax over Sunday, reference to the map would show that a few short miles away, by electric line, was located Crowfoot Lake, and referring to the information on the margin or on the sheets, he would find that this was a summer resort where there were about 1,000 people, where there was fishing, boating, bathing and golf courses, etc. He would find the hotel rates shown and thus be enabled to spend Sunday at a point where he could escape the heat and at the same time enjoy himself and be in better condition to take up his tasks on Monday morning.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:

1. In a travel guide of the kind described and in combination, a geographical chart drawn to scale and provided with symbols designating desired points thereon, a series of symbolic lines connecting said desired points and indicating the detailed character of the travel therebetween, and another series of symbols for visually indicating facts relative to said desired points and intermediate points whereby a travel route may be determined in advance, based upon the facts set forth on the chart, a transparent graduated gage provided with means for indicating distances between points corresponding with the scale to which the chart is drawn and for indicating territory within a predetermined area at each side of the line connecting said desired points, and means provided with minutely detailed information regarding said points.

2. In a travel guide of the kind described and in combination, a geographical chart drawn to scale and provided with symbols designating points thereon and with symbols indicating certain facts relative to said points, a series of symbolic lines connecting said points for indicating the lines of travel therebetween and their character, a gage for indicating the distances between points and also the distances in territory adjacent the lines of travel between the same, and a supplemental chart provided with detail information relative to said points and facts including their size, predominating business, travel accommodation, possible purchasers, and the nature of other business and the value of the same.

In testimony whereof, I have hereunto signed my name in the presence of two subscribing witnesses.

JOHN H. SHARP.

Witnesses:
 ROY W. HILL,
 CHARLES I. COBB.